(12) United States Patent
Steckel et al.

(10) Patent No.: US 9,857,465 B2
(45) Date of Patent: Jan. 2, 2018

(54) SYSTEM AND METHOD FOR TARGET DETECTION

(71) Applicant: UNIVERSITEIT ANTWERPEN, Antwerp (BE)

(72) Inventors: Jan Steckel, Rupelmonde (BE); Herbert Peremans, Ghent (BE)

(73) Assignee: UNIVERSITEIT ANTWERPEN, Antwerp (BE)

( * ) Notice: Subject to any disclaimer, the term of this patent is extended or adjusted under 35 U.S.C. 154(b) by 141 days.

(21) Appl. No.: 14/383,651

(22) PCT Filed: Mar. 7, 2013

(86) PCT No.: PCT/EP2013/054667
§ 371 (c)(1),
(2) Date: Sep. 8, 2014

(87) PCT Pub. No.: WO2013/132038
PCT Pub. Date: Sep. 12, 2013

(65) Prior Publication Data
US 2015/0016225 A1  Jan. 15, 2015

(30) Foreign Application Priority Data
Mar. 8, 2012 (GB) .................................. 1204141.4

(51) Int. Cl.
*G01S 15/87* (2006.01)
*G01S 15/93* (2006.01)
(Continued)

(52) U.S. Cl.
CPC ............ *G01S 15/876* (2013.01); *G01S 7/526* (2013.01); *G01S 15/931* (2013.01); *G05D 1/0255* (2013.01)

(58) Field of Classification Search
CPC ........ G01S 7/526; G01S 15/931; G01S 15/876; G05D 1/0255
See application file for complete search history.

(56) References Cited

U.S. PATENT DOCUMENTS

| 4,771,289 A | 9/1988 | Masak |
| 5,808,962 A | 9/1998 | Steinberg et al. |

(Continued)

FOREIGN PATENT DOCUMENTS

| BE | CA 2864648 A1 * | 9/2013 | ............. G01S 7/526 |
| BE | GB 2500052 A * | 9/2013 | ............. G01S 7/526 |

(Continued)

OTHER PUBLICATIONS

Saruwatari, Hiroshi et al., "Synthetic Aperture Sonar in Air Medium Using a Nonlinear Sidelobe Canceler", Electronics and Communications in Japan, Part 3, vol. 82, No. 12, Dec. 1, 1999, pp. 13-25.

(Continued)

*Primary Examiner* — Daniel Pihulic
(74) *Attorney, Agent, or Firm* — Justin Cassell; Workman Nydegger

(57) ABSTRACT

A sonar based sensor for localization of a target in air is described. The sensor comprises a wide or ultra-wide band emitter for emitting a wide or ultra-wide band signal, and a set of spatially randomly or irregularly positioned receivers for receiving the wide or ultra-wide band signal after reflection at the target. A corresponding processor and method for localizing also is disclosed.

18 Claims, 7 Drawing Sheets

(51) Int. Cl.
*G01S 7/526* (2006.01)
*G05D 1/02* (2006.01)

(56) References Cited

U.S. PATENT DOCUMENTS

| | | |
|---|---|---|
| 7,796,470 B1 | 9/2010 | Lauder et al. |
| 2002/0107048 A1 | 8/2002 | Berger et al. |
| 2015/0016225 A1* | 1/2015 | Steckel .................. G01S 7/526 367/99 |

FOREIGN PATENT DOCUMENTS

| | | | | |
|---|---|---|---|---|
| BE | WO 2013132038 A1 * | 9/2013 | ............. | G01S 7/526 |
| BE | EP 2823332 A1 * | 1/2015 | ............. | G01S 7/526 |
| WO | 99/19939 A1 | 4/1999 | | |
| WO | 00/13038 A1 | 3/2000 | | |
| WO | 00/45194 A1 | 8/2000 | | |
| WO | 2010/020813 A8 | 2/2010 | | |

OTHER PUBLICATIONS

Repetto, S., et al., "Design and Assessment of a Low-Cost 3-D Sonar Imaging System Based on a Sparse Array", IEEE Instrumentation and Measurement Technology Conference (IEEE Cat. No. 06CH37714C) IMTC, pp. 410-415 Apr. 1, 2006.

Trucco, Andrea et al., Devising an Affordable Sonar System for Underwater 3-D Vision, IEEE Transactions on Instrumentation and Measurement, vol. 57, No. 10, Oct. 1, 2008, pp. 2348-2354.

Great Britain Search Report from Application No. GB 1204141.4, Jun. 25, 2012.

Steckel, Jan et al., "A Sonar System using a Sparse Broadband 3D Array for Robotic Applications", 2012 IEEE/RSJ International Conference on Intelligent Robots and Systems, pp. 3223-3228, Oct. 7, 2012.

International Search Report from Corresponding International Application No. PCT/EP2013/054667, May 7, 2013.

* cited by examiner

SYSTEM AND METHOD FOR TARGET DETECTION

FIELD OF THE INVENTION

The invention relates to the field of localization of objects. More specifically it relates to methods and systems for localizing objects based on sonar detection of objects in air.

BACKGROUND OF THE INVENTION

Sonar data are found useful for low-level interactions such as real-time obstacle avoidance, but typically are considered unfeasible for providing sensor modality for intelligent robotic interactions with the world. Nevertheless, bats display on a daily basis that sonar sensing does allow rich interactions with the environment by performing a wide array of interesting and intelligent behaviors.

They continuously prove that a sonar system can extract all the necessary information for intelligent interactions with the environment.

In order for a sonar system to be useful for navigation in real-life office environments, it should meet several criteria. First, the sensor should have a wide field of view (FOV), which is useful in navigational tasks in enclosed spaces. Due to the fact that acoustic waves in the ultrasonic range reflect specularly from large surfaces, only sound waves impinging on the normal direction to the surface are reflected back to the sonar sensor. For navigating a corridor, hallway or doorway having the wide FOV is crucial.

Next, the sensor should obtain spatial information on its environment using a single measurement. As the speed of sound in air is fairly slow ($v_s$=343 m/s), a hard upper limit of the maximum measurement rate is constraining the system design. If one scans the environment using mechanical scanning and multiple measurements, the sonar sensor will inevitably have a low information update rate, which is why mechanical scanning should be avoided. Following naturally from this constraint, the amount of information that should be extracted from every measurement should be maximized. The operational complexity associated with mechanical systems further advocate the use of static sonar systems.

Finally, the system should be able to cope with overlapping echoes (i.e. echoes arriving simultaneously at the sensor). Overlapping echoes regularly occur during realistic indoor navigation tasks, for example while navigating through a doorway or a hallway (similar to the first constraint). Echoes from both edges of the doorway will, in an ideal situation (as the robot is driving straight through the door), arrives simultaneously at the sensor. The sensor should be able to distinguish multiple overlapping echoes without making false estimations of the positions thereof (for example, averaging the two echoes into one reflector in the middle).

Existing sonar technology can be roughly divided into two categories: biomimetic sonar systems which try to mimic bate cholocation and which heavily rely on spectrospatial cues introduced by the emitter and receivers, and classic sonar technology which use an array of sensors and differences in arrival times at each sensor to estimate the location of the reflectors.

Biomimetic sonar systems have been proposed several times before. All of these works use broadband emissions and some form of spatial filter, dubbed Head Related Transfer Function (HRTF). As the spectrum of the emission is approximately known in an active sonar system, the difference between the emitted and the received spectra can be calculated. The calculated differences can then be used to estimate the reflector position. The performances and limitation of this type of system has been studied in an information-theoretic context. One of the major limitations that these type of systems have is dealing with overlapping echoes. Simultaneous echoes severely interfere with each other, resulting in one distorted spectrum instead of multiple separate spectra. The distorted spectrum sometimes encodes the direction of the strongest reflector in the case of two reflectors with different strengths, but in the case of equal strong reflections (such as when driving in the middle of a doorway) the resulting spectrum encodes none of the real positions. Filtering introduced by the reflector also degrade the localization performance as most of the biomimetic models assume point-like reflectors with flat frequency responses.

The non-biomimetic sonar systems are not limited to the spectrum based localization algorithms, and can be constructed with any number of sensors and emitters. If only one narrow band sensor is used, only range information can be extracted from the measurement. The most famous example of this system is the Polaroid ultrasonic ranging system. It uses the Time Of Flight (TOF) of the sound waves to estimate the range to the nearest reflector. Building on these systems, clever ways of extracting bearing information have been devised.

For example, a configuration of 3 Polaroid sensors was suggested to provide an unbiased estimate of target positioning 2D based on TOF differences between the sensors. This TOF paradigm has been investigated with relative successes, making use of techniques such as correlation, matched filtering, PCA, etc. Another way of generating spatial information is to mechanically scan the environment using a ranging sensor and a pan/tilt unit. While the generated spatial maps contain high-resolution information, the mechanical scanning makes these type of sensors unfeasible in a robotic navigation application due to the limited information update rate.

Although mechanical scanning is unfeasible in a robotics application, electronic scanning using a phased array of receivers can be an interesting way of solving several issues. One generates a spatial filter using an array of closely spaced transducers and appropriate signal processing techniques, ranging from simple delay and sum beam forming to high resolution subspace beam forming techniques. This spatial filter can be steered into several directions in post processing, without the need for multiple measurements. Sonar systems using array technology have been proposed repeatedly in the literature. Although different types of arrays are proposed, using a variety of signal processing techniques and array topologies and both narrow band and broadband echolocation signals, there is still a need for a good echolocation system.

SUMMARY OF THE INVENTION

It is an object of embodiments of the present invention to provide a good system and method for localization of one or more targets.

It is an advantage of embodiments according to the present invention that a good resolution, e.g. sufficiently good for performing accurate localization, is obtained. It is an advantage of embodiments of the present invention that the obtained spatial resolution can be sufficiently high for allowing distinguishing different objects even if they are positioned close with respect to each other.

It is an advantage of at least some embodiments of the present invention that a system is provided that is rigid, resulting in a robust system.

It is an advantage of at least some embodiments according to the present invention that a broad field of view can be obtained, e.g. up to a half sphere.

It is an advantage of at least some embodiments according to the present invention that a high measurement speed can be obtained, e.g. up to 10 measurements per second, advantageously up to 15 measurements per second, still more advantageously up to 20 measurements per second. It thereby is an advantage that the scanning can be performed in a non-mechanical way.

It is an advantage of embodiments of the present invention that accurate and useful input can be obtained, although planes of objects act as an acoustic mirror and only reflect sound waves in a specular way, thus rendering observation more difficult compared to e.g. imaging.

The above objective is accomplished by a method and device according to the present invention.

The present invention relates to a sonar based sensor for localization of a target in air, the sensor comprising a wide or ultra-wide band emitter for emitting a wide or ultra-wide band signal, and a set of spatially randomly or irregularly positioned receivers for receiving the wide or ultra-wide band signal after reflection at the target. It is an advantage of embodiments of the present invention that the signals can be encoded such that simultaneous operation with multiple units can be performed. It is an advantage of embodiments according to the present invention that accurate localization of targets can be obtained based on simple processing over a wide field of view using results obtained with the sensor. It is an advantage of embodiments according to the present invention that measurement data with low signal to noise ratios can be obtained, resulting in an improved localization possibility. It is an advantage of embodiments according to the present invention that technological sonar systems are provided that allow intelligent robotic interactions under real-life conditions. The sensor may be configured such that for a single detection event, only a single emitter is used. According to some embodiments of the present invention, the sensor may comprise only one emitter. Such a single emitter may in some embodiments make use of two separate speakers that are playing at the same time. In other words, multiple speakers can be used to emit omnidirectional but the speakers are used at the same time.

The spatially randomly or irregularly positioned receivers may be spatially randomly or irregularly arranged in two directions for allowing three dimensional localization. It is an advantage of at least some embodiments of the present invention that systems can be provided that also can measure azimuth and elevation besides distance, thus allowing to obtain three dimensional images, resulting in a better localization. For some applications, it is an advantage that accurate three dimensional images can be obtained.

The sensor may be adapted for sensing sonar signals and the emitter may be adapted for emitting a sound wave.

It is an advantage of at least some embodiments of the present invention that these are suitable for e.g. moving robots, environmental inspection, automatic driving and/or controlling or support thereof. It is an advantage of embodiments according to the present invention that they can be applied for driving or assisting therein of e.g. electric wheelchairs, fork lifts, cars, robots such as e.g. cleaning robots, different types of vehicles, etc.

The wide or ultra-wide band emitter may be adapted for emitting signals having a bandwidth spanning at least one octave, e.g. at least two octaves, etc. The wide or ultra-wide band emitter may be adapted for emitting signals having a bandwidth of at least 10 kHz, advantageously at least 20 kHz, more advantageously 30 kHz, e.g. for sonar applications. The bandwidth may in some embodiments cover the range 20 kHz to 120 kHz, e.g. 30 kHz to 80 kHz, e.g. 20 kHz to 40 kHz.

The receivers may be distributed sparsely. The receiver density may for example be less than 0.5 receivers/$\lambda_{max}^2$, e.g. between 0.2 and 0.05 receivers/$\lambda_{max}^2$, whereby $\lambda_{max}$ is the maximum wavelength in the wide or ultrawide band signal, although embodiments of the present invention are not limited thereto. It is an advantage of at least some embodiments according to the present invention that the system can be manufactured at relatively low cost, e.g. in view of the limited number of sensors that are required and/or in view of the receivers being positioned at a rigid surface.

The sensor furthermore may comprise a processor for processing the received signals, the processor being adapted for processing an azimuth angle and an elevation angle. It is an advantage of embodiments according to the present invention that accurate 3D determination can be done.

The processor may be adapted for processing the set of receiver signals by applying a matched filter, reconstructing the beams, and extracting an envelope for the signal, for deriving a location of a target.

The set of receivers may be positioned in a fixed configuration with respect to each other. The set of receivers may be mounted on a rigid structure for obtaining such fixed configuration.

The present invention also relates to a processor for processing sonar based sensor signals, the processor comprising an input means adapted for receiving signals from a set of spatially randomly or irregularly positioned receivers and a calculating means for calculating a location of a target in air, the calculating means being adapted for calculating taking into account an azimuth angle and an elevation angle.

The calculating means may be programmed for applying a matched filter, reconstructing the beams, and extracting an envelope for the signal, for deriving a location of a target. It is to be noticed that processing may be performed by using basic delay and sum beam forming. Nevertheless, other, e.g. more complex beam formers, also may be used.

The present invention also relates to a method for locating a target based on sonar, the method comprising obtaining a set of receiver signals, received in response to a wide or ultra-wide band signal after reflection at the target in air, using a set of spatially randomly or irregularly positioned receivers, and deriving a location of the target in air based on the obtained set of receiver signals. The method may comprise using a single emitter for generating the wide or ultra-wide band signal. The wide or ultra-wide band signal may comprise varying frequencies.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
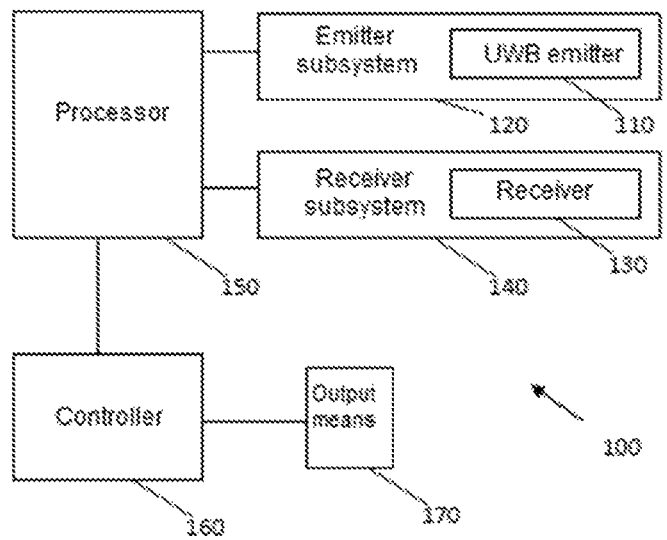
FIG. 1 illustrates a sensor using an ultrawide band emitter and a sparse set of randomly or irregularly positioned receivers, according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a sonar based sensor for localization of a target in air. The sensor thus is an in-air sonar based sensor for sensing in air. Embodiments of the present invention can advantageously be used for numerous applications, such as amongst others for obstacle avoidance systems, e.g. based on potential field techniques, for electronic wheelchairs as e.g. a robust cheap 3D sonar system can be a valuable addition to vision based systems, as an independent estimation of robot motion in SLAM systems using e.g. the system as acoustic odometry module, . . . each time resulting in a significant improve of the system's performance.

By way of illustration, embodiments of the present invention not being limited thereby, standard and optional components of a sensor according to embodiments of the present invention are schematically represented with reference to FIG. 1.

The sensor 100 according to embodiments of the present invention comprises a wide or ultra-wide band emitter 110 which may be part of an emitter sub-system 120. The wide or ultra-wide band emitter 110 is adapted for emitting a wide or ultra-wide band signal. For sonar applications the emitter typically may be a sound emitter. An example of a radio wave emitter that typically is used can be an antenna. An example of a sound emitter that can be used may be a Polaroid emitter. With wide or ultra-wide band signal, a signal may be meant having a bandwidth spanning at least one octave, advantageously at least two octaves, more advantageously more octaves. The wide or ultra-wide band signal may thus span a number of octaves. In one particular example for a sonar application, the bandwidth covered may be 20-80 kHz. According to at least some embodiment of the present invention, only a single emitter is used. According to some embodiments of the present invention, the sensor only comprises a single emitter. The emitter is adapted for emitting a sonar signal suitable for in-air operation. The emitter subsystem 120 may comprise further electronics components for allowing generation of the wide or ultra-wide band signal to be generated. Such electronics components may for example comprise—embodiments not being limited thereto—a digital to analogue converter, an amplifier, such as a high voltage amplifier, etc. The emitter 110, also being part of the emitter subsystem 120, may be a transducer for converting the signal in a suitable signal to be outputted by the emitter, etc. By way of illustration, in one example, the emitter subsystem 120 may comprise an input port for receiving a digital signal in communication with a digital to analogue converter for converting the digital signal into an analogue signal. The emitter subsystem 120 further may comprise a high voltage amplifier for amplifying the analogue signal received from the converter. The amplified signal than can be provided to a transducer, e.g. a Polaroid transducer, for outputting the wide-band signal.

The sensor furthermore comprises a set of spatially randomly or irregularly positioned receivers 130 for receiving the wide or ultra-wide band signal after reflection at the target. The receivers 130 typically may be part of a receiver subsystem 140. The type of receivers 130 used may depend on the technology that is used. For sonar applications the receivers 130 can be microphones, such as for example ultrasonic microphones, although embodiments of the present invention are not limited thereto. As also indicated above, advantageously the signal is wideband and may span at least an octave, advantageously two octave, advantageously more than two octaves.

According to embodiments of the present invention, the receivers 130 are positioned or distributed randomly or irregularly. Alternatively, the receivers 130 could also be a limited random or irregular selection from a set of receivers whereby the full set of receivers forms a pattern. With randomly or irregularly distributed there is meant that the receivers used are occurring without pattern. The receivers may not be occurring in a fully structured array.

The number of receivers 130 that is included in the sensor 100 or that is actively used may depend on the desired peak to sidelobe ratio. During configuration or construction, the number of receivers 130 may be tuned as function of the desired peak to sidelobe ratio. The number of receivers 130 included or actively used during sensing may be considered sparse, also referred to as thinly scattered or distributed. The receiver density may for example be less than 0.5 receivers/$\lambda_{max}^2$, e.g. between 0.2 and 0.05 receivers/$\lambda_{max}^2$, although embodiments of the present invention are not limited thereto, whereby $\lambda_{max}$ is the maximum wavelength in wide or ultrawide band signal. In one example, the density of receivers used may be 0.1 receivers/$\lambda_{max}^2$. E.g. for sonar in air applications the density may be between 300 and 500 receivers/m², e.g. about 450 receivers/m². The spread of the receivers 130, for example expressed as the maximum distance between the receivers in horizontal and vertical direction, will define the aperture size of the set of receivers 130, which will affect the width of the main lobe. The aperture size may be tuned, e.g. during configuration or during manufacturing of the sensor, for obtaining a predetermined width of the main lobe in the detected signal.

The receivers 130 may in some embodiments occur in a fixed configuration. The receivers may be embedded or fixed to a fixed structure, such that a rigid sensor is obtained. The emitter also may be fixed to the fixed structure. Such a fixed structure may be a plate, e.g. a non-flexible plate, although also other types of structures can be used.

As indicated above, the receivers 130 typically may be part of a receiver subsystem 140. Such a receiver subsystem 140 may comprise besides the receivers 130 themselves, also amplifiers for amplifying the detected signals. Furthermore also an analogue to digital converter may be present for converting the analogue detected signals into digital signals. Alternative, the ADC component(s) also may be part of the processor, in communication with the receiver subsystem.

According to embodiments of the present invention, the sensor 100 furthermore comprises a processor 150 for processing the received signals. The processor 150 may be a hardware processor or a software processor making use of processing capacity of a computing means. The processing may be performed in a single processor or split processing may be applied. In some embodiments, part of the signal processing may thus be performed in the processor 150, whereas another part of the signal processing may be performed in a further computing means. According to embodiments of the present invention, the processor 150 may be a digital subsystem. The processor 150 may comprise a calculating means comprising processing power, such as for example an FPGA board, a memory component such as for example an SRAM component, and an output or interface, for connecting the processor with a further processor or with an output means. The output or interface may be any type of interfacing means, such as for example a USB connector, although embodiments are not limited thereto.

Figure 5:
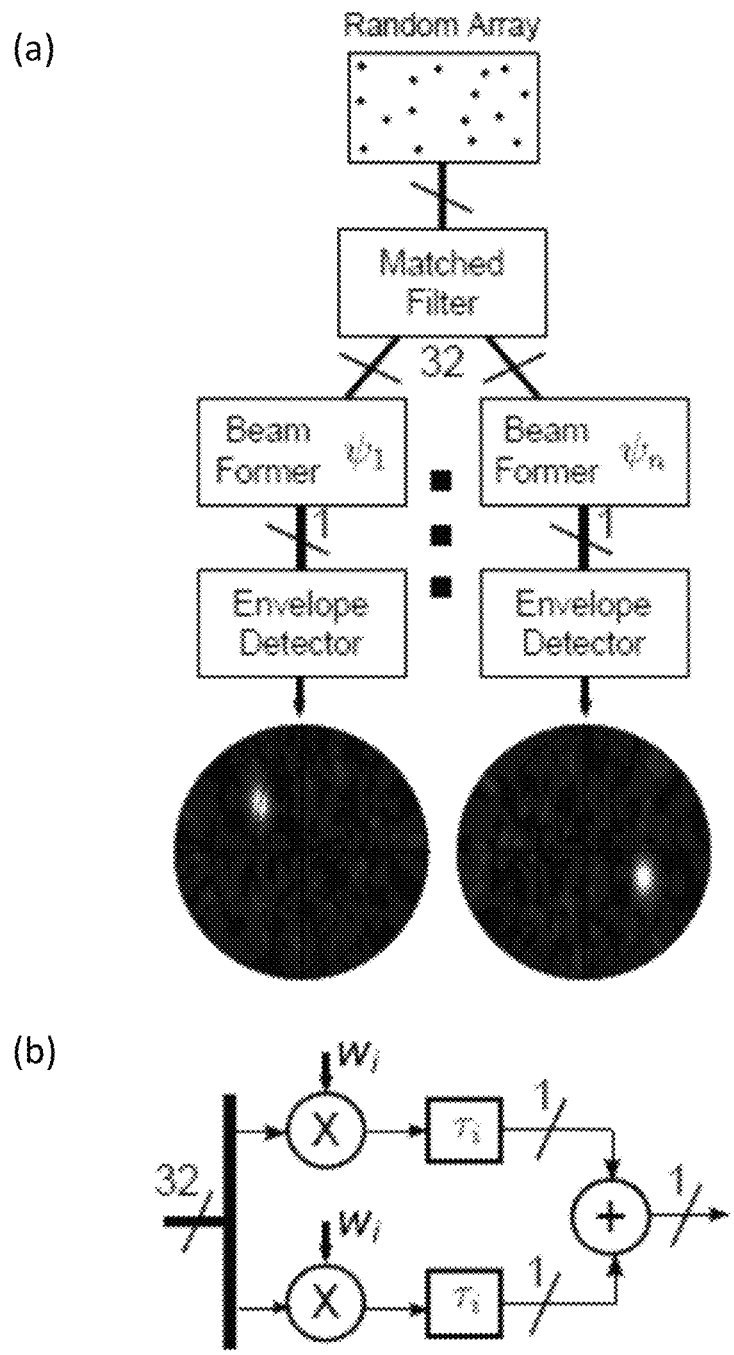
FIG. 5 illustrates a processor flow (a) and details of a beam forming processor (b) according to an embodiment of the present invention.

In some embodiments, the processor 150 may be programmed for receiving the receiver signals, optionally after amplifying and converting into a digital signal. The processor 150 furthermore may be programmed for applying a matched filter and for further filtering using a bank of beam formers thus generating spatial filters in every direction of interest. In one example, the output of each of the beam formers may be passed through an envelope detector. In this way, a set of spatial bandpass filters is applied. The bank of beam formers may provide the functionality of delaying the signal by an appropriate amount and weighing the signals according to weights generated by a weighing function. By way of illustration, embodiments of the present invention not being limited thereto, an example of a processing system and components thereof is shown in FIG. 5. The output of such a system corresponds with a single signal from a virtual receiver with an arbitrary directivity.

The processing may allow for deriving a localization of the object(s) reflecting the emitted radiation, three dimensional position determination. The processor may be adapted for providing an azimuth angle and an elevation angle as well as a distance, thus determining the full three dimensional position. In some embodiments, also a further processing means, such as for example a computer may be used for providing processing power and memory for performing processing tasks.

The processor may also comprise a controller 160 or a separate controller 160 may be provided. The controller 160 may be adapted for controlling the emission of one or more wide or ultra-wide band signals by the emitter 110 or emitter sub-system 120 and for controlling the detection by the receivers 130 or the receiver sub-system 140. The controller may provide timing information to the emitter sub-system and the receiver sub-system for synchronizing the emission and detection of signals. The controller furthermore may be adapted for controlling the processing as function of the detected signals.

The sensor 100 also may comprise an output means 170. Such an output means 170 may be any suitable output means 170. It may for example an output port, a displaying means, a printer/plotter, a data transmission line, a memory from where the results can be read, etc. The output means may be part of the processor or obtain the information to be outputted from the processor.

According to a particular embodiment of the present invention, the output may be performed using a particular metric further referred to as the Energy Scape and representing the spatial distribution of reflectors by means of the amount of energy the reflectors reflect back to the sensor. Further features and advantages of the metric are described in more detail in the example provided below.

It will be understood that embodiment of the present invention are not limited to and by the optional components as described above and that further optional components known by the person skilled in the art can be added to the sensor.

According to one aspect, the present invention also relates to a method for locating a target in air based on sonar. The method may be especially advantageously performed using a system as described with reference to the first aspect, although embodiments of the present invention are not limited thereto. According to embodiments of the present invention, the method comprises obtaining a set of receiver signals, received in response to a wide or ultra-wide band signal after reflection at the target, using a set of spatially randomly or irregularly positioned receivers, and deriving a location of the target in air based on the obtained set of receiver signals. Obtaining a set of receiver signals thereby may be obtaining a set of receiver signals from a sparsely distributed set of receivers.

Figure 2:
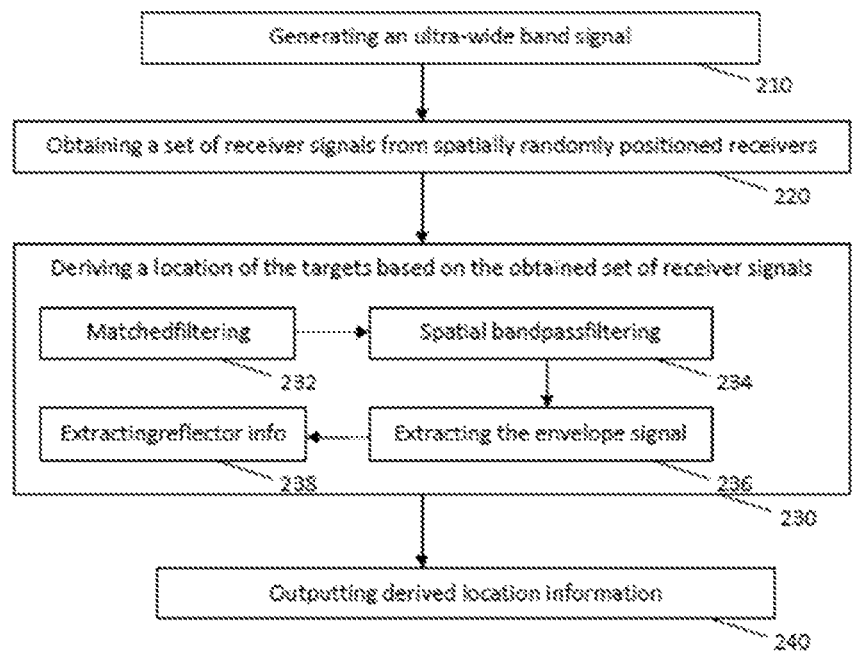
FIG. 2 illustrates a schematic flow diagram of a method for localizing an object, according to an embodiment of the present invention.

By way of illustration, embodiments of the present invention not being limited thereto, an exemplary method comprising standard and optional steps is described with reference to FIG. 2.

The method 200 comprises obtaining 220 a set of receiver signals, received in response to a wide or ultra-wide band signal after reflection at the target, using a set of spatially randomly or irregularly positioned receivers. The receivers thereby may be controlled for detecting in reply to a wide or ultra-wide band signal emitted, and the receiving action from the receivers may be part of the method. Alternatively, obtaining the signals also may refer to the action of obtaining data from the set of receivers. In some embodiments controlling the receivers for detecting also may be part of the method. Such controlling may for example be based or triggered by the generation of a wide or ultra-wide band signal. The step of generating 210 a wide or ultra-wide band signal may be part of the method 200, although embodiments of the present invention are not restricted thereto.

The method 200 furthermore comprises deriving 230 a location of the target(s) based on the obtained set of receiver signals. Deriving 230 a location of the target(s) may be determining a three dimensional position of the target, e.g. built up from a distance, elevation and azimuth angle. According to some particular embodiments, deriving 230 a location of the targets may comprise matched filtering 232. Such matched filtering may for example comprise applying a Fourier transform filter to the received signal and to the originally emitted signal, although other types of matched filters also could be applied. After the matched filtering has been performed, the deriving may comprise implementing a spatial bandpass filtering 234. In some embodiments, such a spatial bandpass filtering may be performed by applying a beam forming process. Such beam forming process may be performed by delaying every signal by an appropriate amount, by weighing according to weights generated by a weighing function and by summing the signals, although other beam forming algorithms also may be used. In a further step, after beam forming, the envelope signal is extracted. Extracting the envelope signal 236 can be performed for example using the magnitude of the Hilbert transform of the summed signal obtained by beam forming, for example by applying half wave rectification and lowpass filtering, etc. In yet a further step 238, information regarding the reflectors is extracted from the signal envelope. Such information extraction may be extraction of e.g. the reflector distribution as function of the angle, extraction of e.g. a distance of the reflector for example based on the time axis, e.g. strength of the reflector, . . . . Deriving 230 a location in air also may comprise deriving the information using a particular metric regarding the position of one or more targets, such as for example the metric energy scape as described elsewhere in this application.

After deriving 230 a location in air of the one or more targets, the method also may comprise outputting 240 the derived location information. Such an output may be in any suitable form. Furthermore, the output may be provided for any suitable application.

It is to be noticed that the above described method also may comprise other method steps, e.g. expressing the functionality of components as described in the first aspect, embodiments of the present invention not being limited thereby.

In a further aspect, the present invention relates to a computer program product for, when executing on a processing means, for example in a device according to the first aspect of the invention, carrying out one of the methods or part of one of the methods according to the second aspect of the invention, as well as to a corresponding processing system. In other words, methods according to embodiments of the present invention may be implemented as computer-implemented methods, e.g. implemented in a software based manner. The processing system may be a processor as described in the first aspect. One example of a processing system may be a processing system that includes at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of embodiments of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included. The various elements of the processing system may be coupled in various ways, including via a bus subsystem, in the present example for simplicity a single bus, but will be understood to those skilled in the art to include a system of at least one bus. The memory of the memory subsystem may at some time hold part or all of a set of instructions that when executed on the processing system implement the steps of the method embodiments described herein.

In further aspects, the present invention relates to a data carrier storing a computer program product as described above or to the transmission thereof over a wide or local area network. Such a data carrier can thus tangibly embody a computer program product as described above. The carrier medium therefore may carry machine-readable code for execution by a programmable processor. The present invention thus relates to a carrier medium carrying a computer program product that, when executed on computing means, provides instructions for executing any of the methods as described above or execute the filtering function of the filter described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Figure 3:
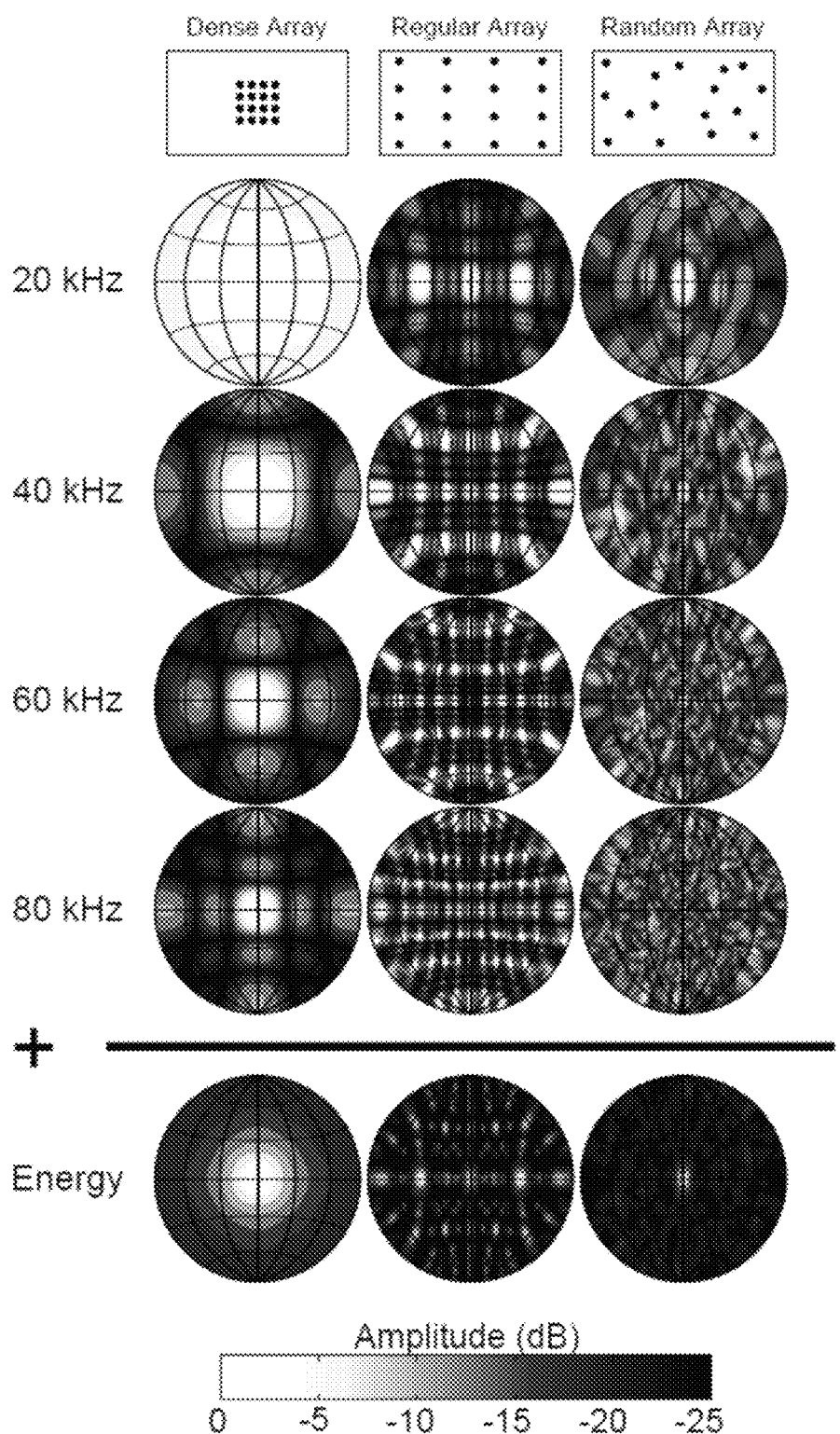
FIG. 3 illustrates a comparison of array directivity patterns for a dense array, for a large array and for a random sparse array, illustrating advantages of embodiments according to the present invention.

Without wishing to be bound by theory, the advantageous results of the above described system can be understood from the below mentioned considerations. The above mentioned systems are based on an array of ultrasonic microphones and a single Polaroid emitter. Based on classic narrow band array beam forming theory, the maximum signal frequency for any given array that can be resolved unambiguously is equal to:

$$f_{max} = \frac{v_s}{2d} \quad [1]$$

which equals to:

$$d_{max} = \frac{\lambda_{min}}{2} \quad [2]$$

with $v_s$ the propagation speed of sound, $\lambda_{min}$ the minimal wavelength of the signal, and d the inter-element spacing of the array elements. Frequencies above $f_{max}$ will cause ambiguities in the localization performance due to grating lobes. However, the width of the main lobe is inversely correlated to the total aperture size, as the directivity pattern of an array has a 2D Fourier Transform relationship to the aperture of the array. This implies that, when only a limited number of array elements is used, only spatial filters with a wide main lobe can be constructed (because of the limited size the aperture can have). This does not allow to resolve multiple closely spaced reflectors due to interference and leaking of the spatial filters, similar to side lobe interference in matched filter theory. If one allows frequencies above $f_{max}$, secondary grating lobes with the same amplitude as the main lobe will occur. For a given array topology, the position of the grating lobes however, is dependent on the signal frequency, while, with the correct processing, the position of the main lobe remains fixed into the same direction. This phenomenon can be exploited by a broadband system with a frequency range spanning several octaves. When only the energy of the received signal is considered (and not the signal at every frequency independently), it has a directivity pattern which is the average of the individual directivity patterns at the individual frequencies. FIG. 3 shows this phenomenon. The first column shows the directivity patterns for a dense array consisting of 16 elements arranged in a square configuration. One can distinguish a single main lobe in the directivity patterns up to 80 kHz, without the occurrence of any grating lobes. Furthermore, the directivity pattern of the energy of the signal shows a single broad main lobe with the absence of grating lobes. The second column shows what happens if the array aperture is widened (in fact lowering $f_{max}$ for the array). For all the frequencies, grating lobes occur which are equally strong as the main lobe. Furthermore, the signal energy pattern still contains secondary grating lobes due to the regular structure of the sensor array. The third column shows an array of randomly or irregularly distributed sensors. The patterns for the individual frequencies show a narrow main lobe with grating lobes occurring at random locations (which can naturally be related to the positions of the array elements). However, the signal energy contains no grating lobes and only a narrow main lobe, resulting in a very narrow spatial filter for the matched-filtered broadband signal. This filter (i.e. the position of the main lobe) can be scanned in both the azimuth as the elevation direction independently, allowing the estimation of signal energy originating from any arbitrary position in space.

By way of illustration, embodiments of the present invention not being limited thereto, experimental results illustrating features and advantages of particular embodiments of the present invention are discussed below.

Figure 4:
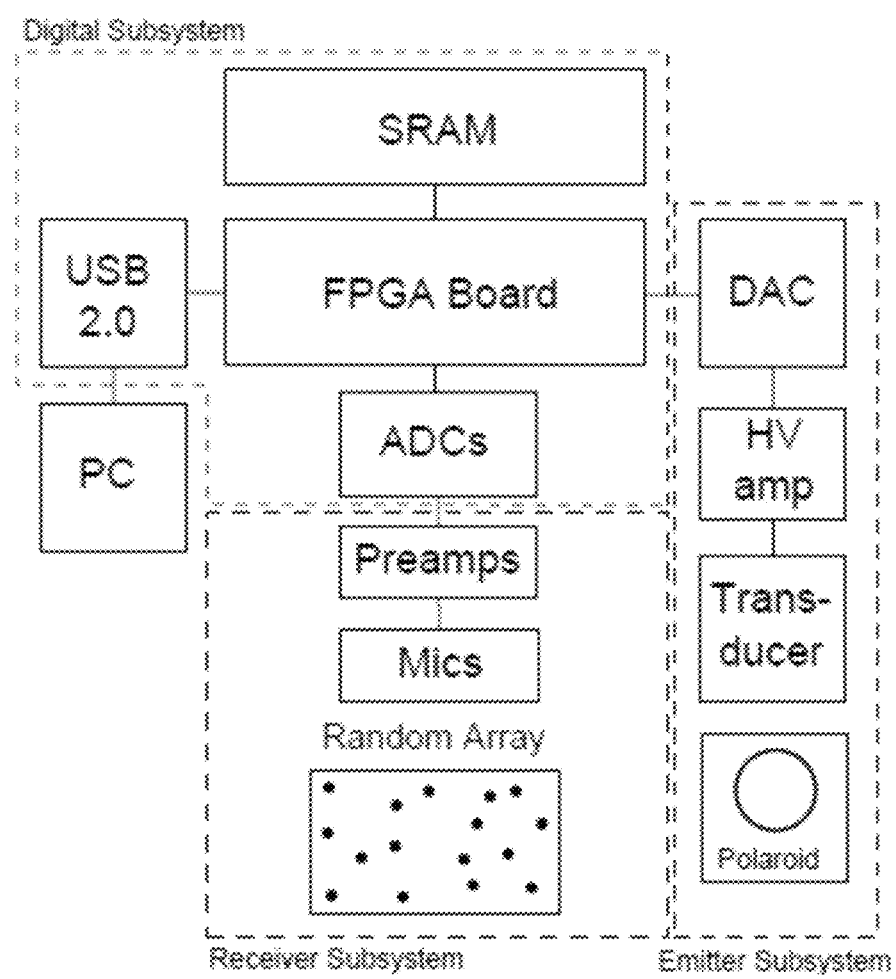
FIG. 4 illustrates an example of building blocks of a sensor for localizing, according to an embodiment of the present invention.

The experimental results are obtained with a sensor comprising an array of ultrasonic microphones and a single Polaroid emitter. By way of illustration, a schematic overview of the different blocks that make up the sonar array system used for obtaining the experimental results is given in FIG. 4. The system consists of an Altera Cyclone I FPGA, which connects to a computer via an FTDIUSB 2.0 FIFO interface, allowing a maximum data transfer speed of 25 MByte/sec. A custom made MEX Matlab interface gathers the data from the USB bus and presents it to the processing module. As a data buffer, an SRAM is connected to the FPGA. A 12 bit DAC with a sampling rate of 250 ksps/sec connects to a custom made high-voltage amplifier which in turn drives a single Polaroid transducer. The receiver consists of a custom made array of 32 tiny condenser microphones with a diameter of just 2.54 mm, yielding an omnidirectional receiver for the frequencies of interest. The microphone signals are amplified using a custom made amplifier with a 6th order butterworth anti-alias filter at 150 kHz. The signals are digitized using 12 bit AD converters running at 500 kHz. A single emitter consisting of a Polaroid transducer is driven through a High-voltage amplifier by a Digital-to-Analog Converter (DAC). As emitted signal, a bat-like hyperbolic FM-sweep is used with a start frequency of 100 kHz and a stop frequency of 20 kHz. The amplitude is modulated by a hamming window to prevent transient effects in the transducers and analog filters.

The experimental results discussed below are obtained making use of the following array signal processing. The array consists of 32 microphones, each receiving a version of the echo signals, denoted by $s_i^M(t)$ with i=1 ... 32. The received signals are processed using a matched filter:

$$s_i^M(t) = \mathcal{F}^{-1}\{S_i^M(j\omega) \cdot S^*_b(j\omega)\} \qquad [3]$$

with $S_i^M(j\omega)$ the Fourier transform ([51]) of the i-th microphone signal $S_i^M(t)$ and $S^*_b(j\omega)$ the Fourier transform of the emitted signal (which is known approximately to the system). After matched filtering, the beam forming process takes place to implement spatial bandpass filtering. As the system needs to be able to resolve targets in 3D, two different angles need to be considered: the azimuth angle (θ) and the elevation (φ). These two angles are combined into one direction vector called ψ=[θ φ].

The beam forming process can be written as:

$$S_\psi^{BF}(t) = \sum_{i=1}^{32} w_i \cdot s_i^{MF}(t + \tau_i(\psi)) \qquad [4]$$

with $w_i$ the weight (a scaling factor) for the i-th microphone, $\tau_i(\psi)$ the delay for the i-th microphone for direction, and $s_i^{MF}$ the matched filtered version of the i-th microphone signal. After beam forming, the envelope of the signal is extracted using the magnitude of the Hilbert transform $$s_\psi^{EN}(t) = |H(s_\psi^{BF}(t))| \qquad [5]$$

or an approximation thereof by simple AM demodulation by means of half wave rectification and lowpass filtering. The signal envelope $s_\psi^{EN}(t)$ now contains information about the reflector distribution in direction ψ, and the time axis gives information about the range of the reflector. The strength of the reflector can be estimated due to the fact that a matched filter has been used, as the squared maximum of the output of the matched filter equals to the signal energy.

To get a continuous representation of the environment, an entity called the Energy Scape (ES) is introduced. The energy scape represents the spatial distribution of reflectors by means of the amount of energy the reflectors reflect back to the sensor. This step does not need any a-priori information of the distribution and type of reflectors. The energy scape can be estimated by concatenating the envelopes of the matched filter outputs $s_\psi^{EN}(t)$ for all different directions ψ one is interested in. In the most general case, this is a 3D structure:

$$E(t, \psi) = \begin{bmatrix} s_{(\theta_1,\varphi_1)}^{EN} & s_{(\theta_2,\varphi_1)}^{EN} & \cdots & s_{(\theta_n,\varphi_1)}^{EN} \\ s_{(\theta_1,\varphi_2)}^{EN} & s_{(\theta_2,\varphi_2)}^{EN} & \cdots & s_{(\theta_n,\varphi_2)}^{EN} \\ \cdots & \cdots & \cdots & \cdots \\ s_{(\theta_1,\varphi_m)}^{EN} & s_{(\theta_2,\varphi_m)}^{EN} & \cdots & s_{(\theta_n,\varphi_m)}^{EN} \end{bmatrix} \qquad [6]$$

with n the number of desired azimuth directions and m the number of desired elevation directions. As the signal $s_{(\theta,\varphi)}^{EN}$ is a vector of time (range) samples, the energy scape E(t,ψ) is a 3D structure with the time (range) dimension as the third dimension. It should be noticed that E(t,ψ) should be sampled in a spherical coordinate system rather than a Cartesian coordinate system. Using an equal area sampling to distribute points equally on a sphere, a non-uniform sampling in θ and φ is performed, which alleviates the necessary computations dramatically. For example in the extreme cases for the elevation angles +90° and −90°, all the azimuth values represent the same point in space (the top and the bottom of the sphere), and thus, all the calculations will yield the same results. Therefore it is interesting to adequately sample the sphere.

As visualizing 3D structures such as E(t,ψ) is troublesome one can also make 2D scans of the environment (which are basically a subset of the complete 3D measurement). For example, if one varies the azimuth angle θ=−90° ... 90° and keeps the elevation angle constant (φ=0°), one gets the energy distribution in the horizontal plane:

$$E(t,\theta) = [s_{\theta_1}^{EN}(t) s_{\theta_2}^{EN}(t) \ldots s_{\theta_n}^{EN}(t)] \qquad [7]$$

with n the number of azimuth directions θ. Similarly, a vertical scan in the midsaggital plane is:

$$E(t,\varphi) = [s_{\varphi_1}^{EN}(t) s_{\varphi_2}^{EN}(t) \ldots s_{\varphi_n}^{EN}(t)] \qquad [8]$$

The above considerations were taken into account for obtaining the experimental results described below.

Figure 6:
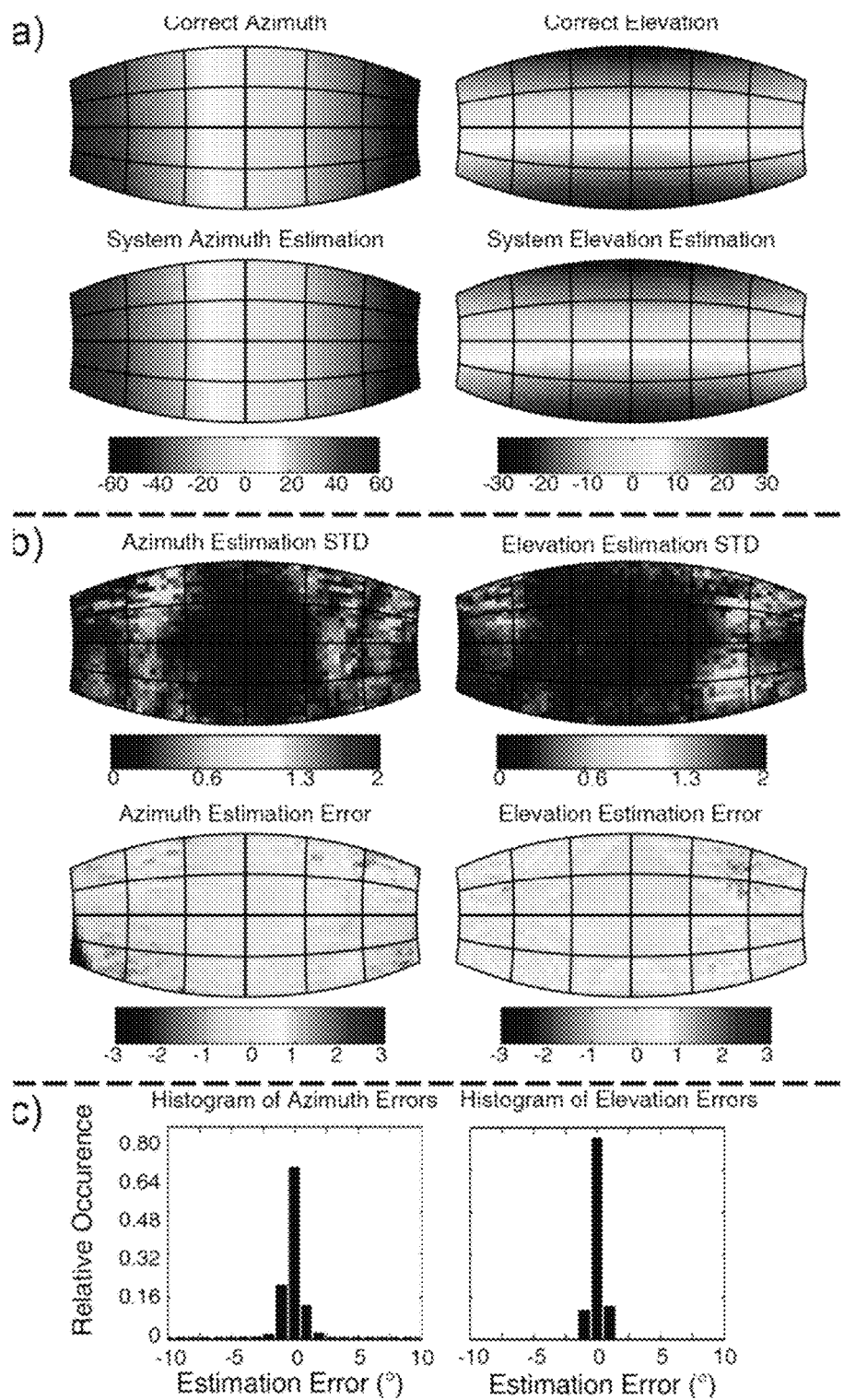
FIG. 6 illustrates a comparison between the actual position and an estimated position for azimuth and elevation and a histogram of the estimation errors, illustrating advantages of embodiments of the present invention.

In order to verify the angular resolution of the system, a single spherical target was ensonified using a single sonar ping. The sphere was hung in front of the array which was mounted on a automated pan/tilt system. The pan/tilt system has two degrees of freedom, being the pan angle α and the tilt angle β. The array was panned over α=−60° ... 60° and tilted over β=−28° ... 28°. As the axis of rotation of these two degrees of freedom did not correspond to real azimuth and elevation angles, a geometrical transformation was performed to calculate the azimuth and elevation angles for a certain α, β pair. This yielded an azimuth range of θ=−60° ... 60° and an elevation range of φ=−30° ... 30°. The system ensonified the sphere and located the sphere by looking at the first large blob in the 3D energy scape. FIG. 6 depicts the errors during the localization. The histogram of the errors shows a small bias, which is caused by imperfections in the experimental setup. Furthermore, it shows that azimuth estimation errors are concentrated in a range of ±5° and elevation estimation errors are concentrated in a range of ±5°, indicating quite high accuracy of the localization system, over a wide field of view.

Figure 7:
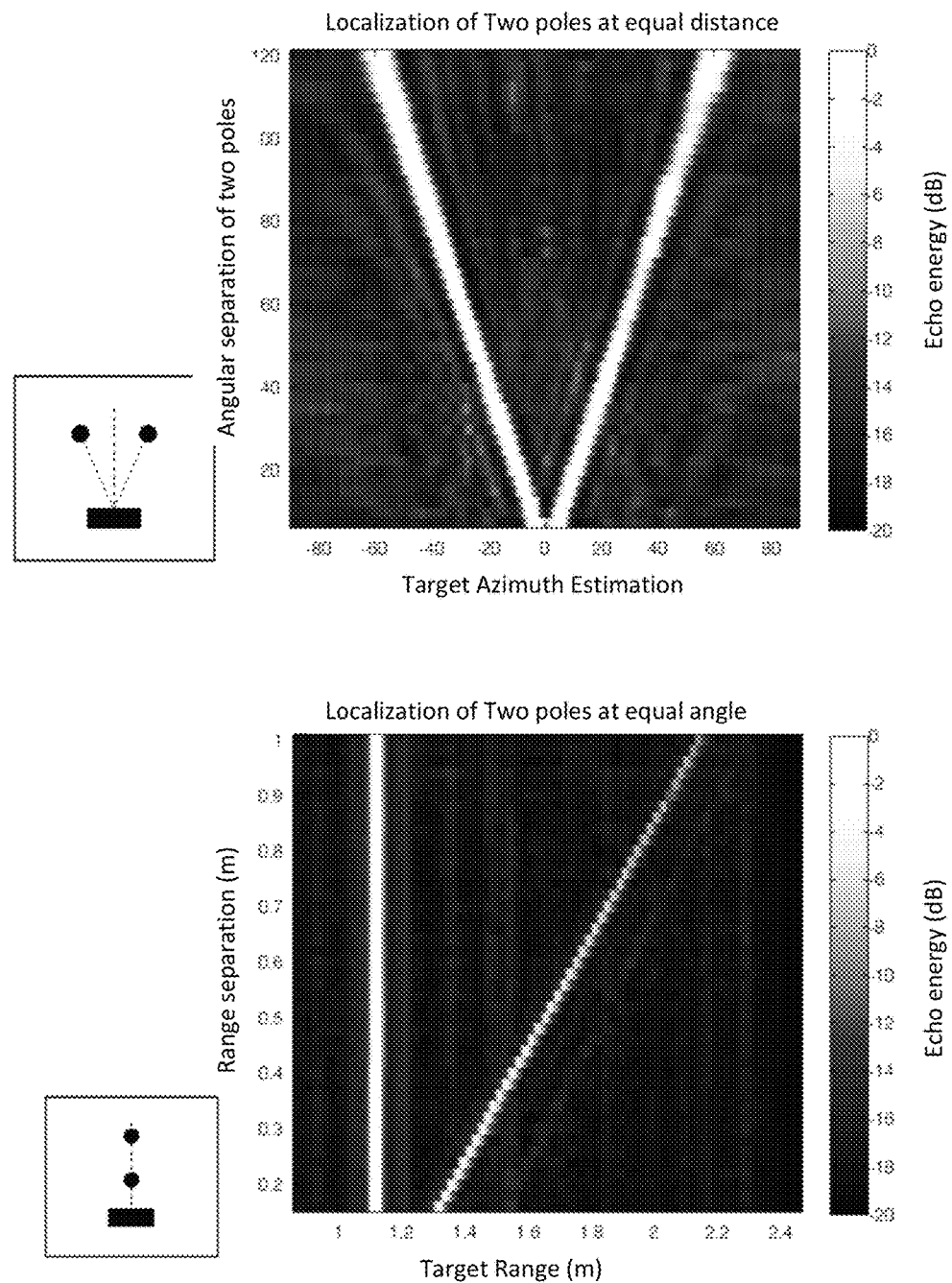
FIG. 7 illustrates sensing results of two identical poles at identical ranges causing simultaneous echoes (configuration upper left, detection results upper right) and of two poles right in front of the sensor but with varying ranges (configuration lower left, detection results lower right).

In order to quantify the angular resolution the system exhibits, an experiment using two simultaneous arriving echoes has been conducted. On an equal distance from the sensor (80 cm), two identical poles have been positioned as depicted in FIG. 7(a). The inner angle (γ) between the two poles was varied from 120° to 5° in steps of 2.5°. The energy scape of the scene was calculated in the horizontal plane, and the response at a constant range of 80 cm was plotted for all inner angles in function of the azimuth angle θ on a logarithmic scale. The results indicate that two reflectors at an equal distance can still be identified as individual reflectors for angular separations as small as 5°. The amount of angular separation can be linked directly to the width of the main lobe of the spatial filters implemented by the array. Indeed, the wider the main lobe of the spatial filters, the sooner two reflectors will merge into one single peak. This merging results in a loss of ability to distinguish the individual reflectors. This is very similar to what happens when using a matched filter to distinguish two duplicates of a time signal: once the sidelobes of the autocorrelation function of the emitted pulse start to overlap, the individual signals can no longer be distinguished. The higher the frequency content (i.e. bandwidth) of the emitted signal, the more concentrated the signal energy will be around the steering direction of the array (the main lobe is more narrow). This allows a higher resolution imaging of the targets.

The range resolution of the system has been verified by placing one narrow pole in front of the system at 1.15 m ($\theta=0°$, $\varphi=0°$), and a second pole right behind it as depicted in FIG. 7(c). The distance between the poles was varied from 1 m to 0.2 m. After taking a snapshot for every separation, the energy scape of the scene was calculated, and the responses in the forward direction ($\theta=0°$, $\varphi=0°$) were combined into an image and plotted. FIG. 7(d) shows the resulting image on alogarithmic scale. Clear separation of the two reflectors can be seen throughout the whole range of separations. A secondary reflection caused by the fixture of the array can be noticed as faint secondary lines in the image. The details of the ability to distinguish between two reflectors are based on classical matched filter theory, and will not be discussed in detail in the current work.

Figure 8:
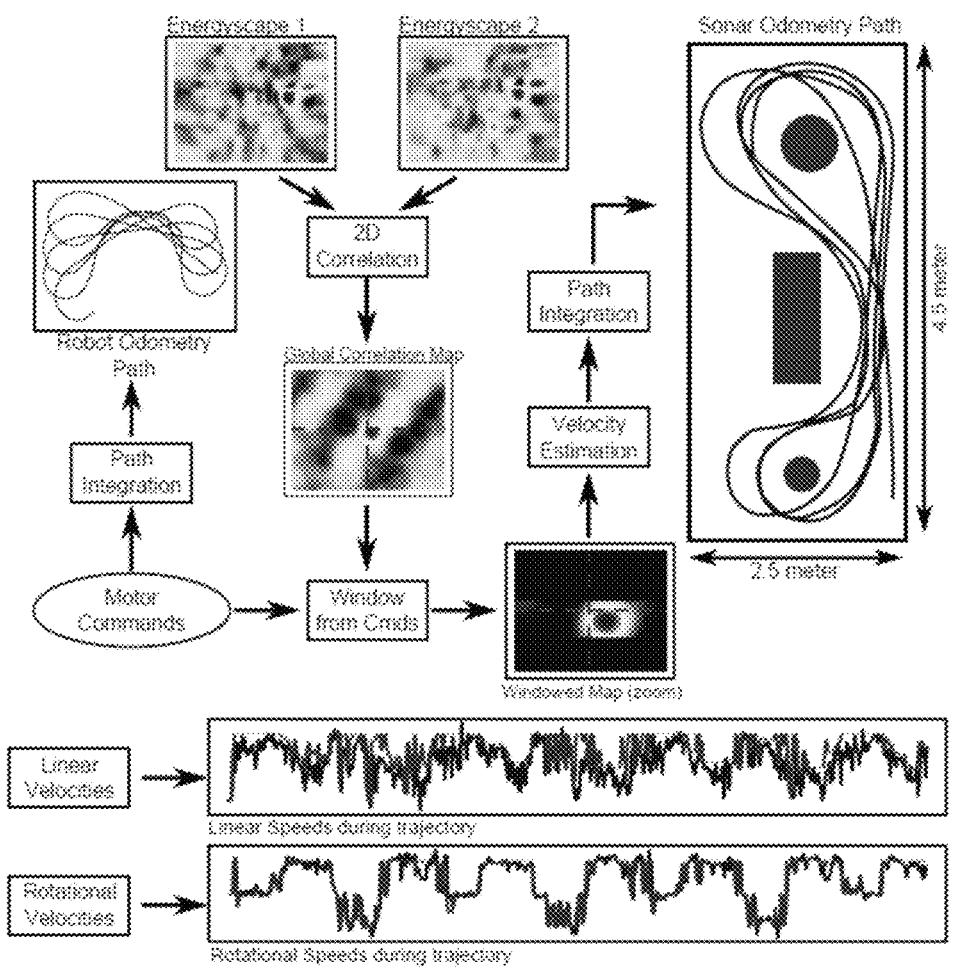
FIG. 8 illustrates a schematic overview of acoustic odometry as can be performed using a system according to embodiments of the present invention.

Due to the nature of the sonar sensor, being that it is able to resolve range, azimuth and elevation from a single measurement in a continuous manner over a wide field of view, the system can be used for the calculation of acoustic odometry analog to the visual odometry systems. Visual odometry systems estimate the motion of a mobile agent by calculating the linear and rotational parts of the agent's speed. Analog to this technique, the acoustic sensor can be used for estimating the linear and rotational component of our robot's motion. The system was mounted on a mobile robot which drove around in a normal unmodified office environment, collected sonar snapshots with a rate of 4 Hz, and calculated for every snapshot the energy scape. Two consecutive energy scapes are correlated to find the relative shift between them, and the maximum of the correlation peak, within a window around the expected displacement derived from the motor commands, is located. The position of the maximum correlation peak is refined by means of a parabolic fit to the points around the maximum and using the maximum of the fitted parabola instead of the initial maximum of the correlation function. This interpolation method is widely used in vision techniques. In a last step, the rotational and linear speeds from each snapshot pair are fed into a path-integration algorithm, and the resulting paths are shown in FIG. 8. The resulting path was found to be consistent for the duration of the measurement, and are an improvement of the path estimate coming from the motor commands. This is a good indication of the performance of the array sensor in realistic, structured environments, as the robot is able to track objects over time and reconstruct it's own movement from these measurements.

Figure 9:
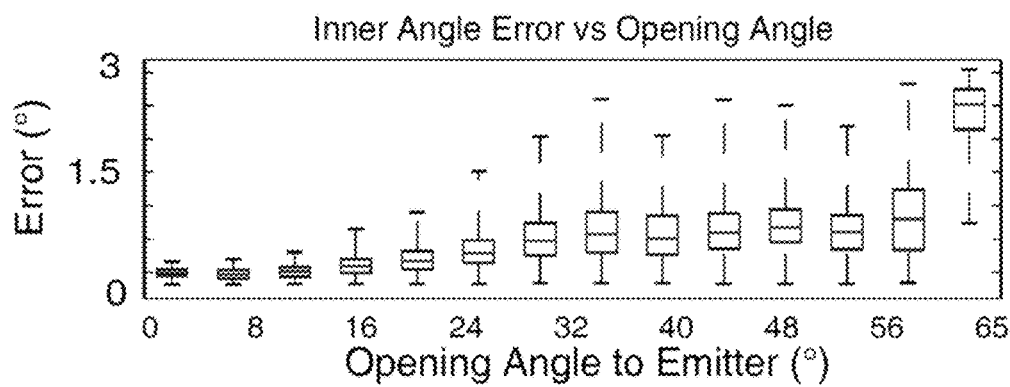
FIG. 9 illustrates the spatial distribution of the inner angle error as function of the opening angle, illustrating features of embodiments of the present invention.

An illustration of the accuracy with which detection can be obtained is given for an exemplary system in FIG. 9. FIG. 9 illustrates the inner angle error as function of the opening angle with respect to the emitter. It can be seen that the error increases when the opening angle increases, but that in all cases, the error on the angle is quite limited.

The invention claimed is:

1. A sonar based sensor for localization of a target in air, the sensor comprising:
    a wide or ultra-wide band emitter for emitting a wide or ultra-wide band signal; and
    a set of spatially randomly or irregularly positioned receivers for receiving the wide or ultra-wide band signal after reflection at the target
    wherein the wide or ultra-wide band emitter is adapted for emitting a wide or ultra-wide band signal having a bandwidth spanning at least one octave, and
    wherein the sensor comprises a processor programmed for processing the received signals thereby applying a matched filter and applying spatial bandpass filtering by beamforming processing.

2. A sensor according to claim 1, wherein the spatially randomly or irregularly positioned receivers are spatially randomly or irregularly arranged in two directions for allowing three dimensional localization.

3. A sensor according to claim 1, wherein the sensor is arranged for sensing sonar signals and wherein the emitter is arranged for emitting a sound wave.

4. A sensor according to claim 1, wherein the receivers are distributed sparsely.

5. A sensor according to claim 1, wherein a receiver density is less than 0.5 receivers/$\lambda_{max}^2$, whereby $\lambda_{max}$ is the maximum wavelength in the wide or ultra-wide band signal.

6. A sensor according to claim 1, the sensor furthermore comprising a processor for processing the received signals, the processor being configured for determining an azimuth angle and an elevation angle.

7. A sensor according to claim 6, wherein the processor is configured for processing the set of receiver signals by
    extracting an envelope for the signal, for deriving a location of a target.

8. A sensor according to claim 1, wherein the set of receivers are positioned in a fixed configuration with respect to each other.

9. A sensor according to claim 1, wherein the sensor comprises only a single emitter.

10. A processor for processing sonar based sensor signals, the processor comprising:
    an input means arranged for receiving signals from a set of spatially randomly or irregularly positioned receivers, the signals being in reply to the wide or ultra-wide band signal after reflection at a target in air, the wide or ultra-wide band signal having a bandwidth spanning at least one octave; and
    a calculating means arranged for calculating a location of a target in air, the calculating means being configured for calculating taking into account an azimuth angle and an elevation angle,
    wherein the processor is furthermore adapted for processing the received signals thereby applying a matched filter and applying spatial bandpass filtering by beamforming processing.

11. A processor according to claim 10, wherein the calculating means is configured for
    extracting an envelope for the signal, for deriving a location of a target.

12. A method for locating a target in air based on sonar, the method comprising
    obtaining a set of receiver signals, received in response to a wide or ultra-wide band signal after reflection at the target in air, using a set of spatially randomly or irregularly positioned receivers, the wide or ultra-wide band signal having a bandwidth spanning at least one octave;
    deriving a location of the target in air based on the obtained set of receiver signals,
    wherein said deriving a location of the target comprises processing the received signals thereby applying a matched filter and applying spatial bandpass filtering by beamforming processing.

13. A method according to claim 12, the method furthermore comprising, prior to said obtaining, generating the wide or ultra-wide band signal,
wherein said generating comprises generating a wide or ultra-wide band signal having a bandwidth spanning at least an octave.

14. A method according to claim 12, wherein the method furthermore comprises, outputting derived location information.

15. A method according to claim 12, wherein the deriving comprises applying a matched filter, applying spatial bandpass filtering and extracting an envelope signal.

16. A method according to claim 12, the method being implemented as a set of instructions on a non-transitory computer-readable medium for, when executing on a processing means, carrying out the method.

17. A non-transitory computer-readable medium for storing a set of instructions for, when executing on a processing means, performing a method for locating a target in air based on sonar, the method comprising:
obtaining a set of receiver signals, received in response to a wide or ultra-wide band signal after reflection at the target, using a set of spatially randomly or irregularly positioned receivers, the wide or ultra-wide band signal having a bandwidth spanning at least one octave;
deriving a location of the target in air based on the obtained set of receiver signals,
wherein said deriving a location of the target comprises processing the received signals thereby applying matched filtering and applying spatial bandpass filtering by beamforming processing.

18. A sonar based sensor for localization of a target in air, the sensor comprising:
a wide or ultra-wide band emitter for emitting a wide or ultra-wide band signal being a bat-like hyperbolic FM-sweep; and
a set of spatially randomly or irregularly positioned receivers for receiving the wide or ultra-wide band signal after reflection at the target
wherein the wide or ultra-wide band emitter is adapted for emitting a wide or ultra-wide band signal having a bandwidth spanning at least one octave, and
wherein the sensor comprises a processor programmed for processing the received signals thereby applying a matched filter and applying spatial bandpass filtering by beamforming processing.

\* \* \* \* \*